United States Patent [19]
Dubauskas

[11] 3,775,617
[45] Nov. 27, 1973

[54] SERVO APPARATUS WITH PHOTOSENSITIVE DEVICE AND COMPENSATING CIRCUIT

[75] Inventor: Thomas A. Dubauskas, Waterbury, Conn.

[73] Assignee: The Lewis Engineering Company, Naugatuck, Conn.

[22] Filed: Aug. 10, 1972

[21] Appl. No.: 279,679

[52] U.S. Cl............. 250/205, 250/210, 250/237 R, 250/231 R, 324/99 R
[51] Int. Cl............................................. G01j 1/32
[58] Field of Search.................... 250/205, 208, 209, 250/210, 237 R, 231 R; 324/98, 99 R

[56] References Cited
UNITED STATES PATENTS

| | | | |
|---|---|---|---|
| 3,454,775 | 7/1969 | Gibbs............................. | 250/205 X |
| 2,517,330 | 8/1950 | Marenholtz..................... | 250/208 X |
| 3,582,661 | 6/1971 | Pijis ................................ | 250/205 X |
| 2,944,190 | 7/1960 | Ost.................................. | 250/205 X |
| 3,171,034 | 2/1965 | Tomajulo et al.................. | 250/237 |

*Primary Examiner*—Walter Stolwein
*Attorney*—H. Gibner Lehmann et al.

[57] ABSTRACT

A servo-control apparatus for use with equipment having a servo feedback loop, comprising an electrically energized light-emitting means or lamp, a control photosensitive device having an expansive sensing surface exposed to a portion of the light from said light-emitting means, and a movable light-control member disposed in the path of said light to controllably intercept portions thereof and thus produce defined shadowed and illuminated areas on the said sensing surface. A compensating circuit is provided, for maintaining constant the output response of the control photosensitive device for various given fixed positions of the movable light-control member. The compensating circuit includes a second or compensating photosensitive device which is positioned out of the path of light intercepted by the movable member so as to receive continuous light or excitation from the lamp. This circuit further includes an amplifier having its input connected to the compensating photosensitive device and having its output connected to the lamp to thereby control the intensity of the latter. The compensating circuit operates to maintain constant the output response of the control photosensitive device for given fixed positions of the movable member by balancing out changes which would normally occur in said output response due to such things as temperature drift, aging of both the lamp and the control photosensitive device, etc. The compensating circuit also operates to balance out changes in the output response of the control photosensitive device due to variations in the light transmission medium, such as could arise from lens fogging, or the settling of dust or debris on the lamp surface.

9 Claims, 9 Drawing Figures

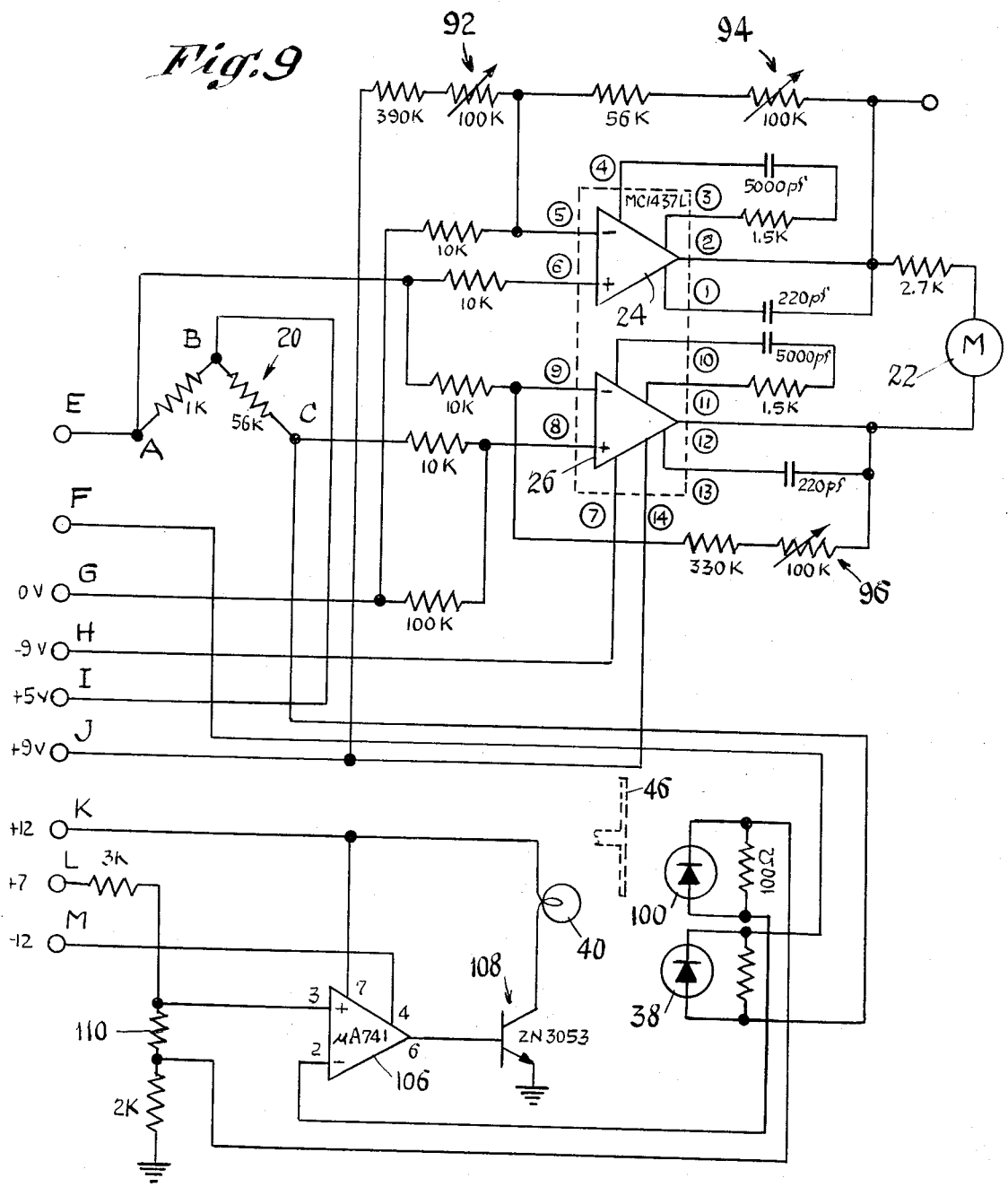

SERVO APPARATUS WITH PHOTOSENSITIVE DEVICE AND COMPENSATING CIRCUIT

CROSS REFERENCES TO RELATED APPLICATIONS

1. Copending application of Harrison F. Edwards et al., Ser. No. 173,748, filed Aug. 23, 1971, entitled "Servo Apparatus", and having the same ownership as the present application.

2. Copending application of Harrison F. Edwards et al., Ser. No. 249,411 filed May 1, 1972, entitled "Servo Device," and having the same ownership as the present application.

BACKGROUND

This invention relates to servo-indicator devices, and more particularly to systems of this type that involve transducers which are sensitive to and influenced by heat, pressure, strain, and other conditions to be measured or controlled. In prior control devices involving photosensitive transducers and light-controlling elements, where a high degree of accuracy was desired it become necessary to employ accurately fabricated components and to adhere to critical tolerances. In addition, the assembly of such devices was often quite involved and complex with the result that the cost of producing a precision instrument become appreciable. While these prior devices operated satisfactorily, the objective of low cost was not always fully met due to the above considerations. Moreover, the prior devices involved a multiplicity of moving parts and were expensive to maintain. Most were also physically large, thus making their use prohibitive for many applications.

SUMMARY

The above disadvantages and drawbacks of prior, servo-type indicators are obviated by the present invention, which has for one of its objects the provision of a novel and improved control apparatus for use in a servo indicator or control device wherein the control apparatus is completely electronic and employs few moving parts, and wherein the fabrication and maintenance costs are significantly reduced. Related objects are to provide an improved servo-indicator device having but a single moving part, wherein standard components already available on the market can be largely utilized and wherein the entire device is relatively small and compact, completely portable, and operable on minute currents such as are obtainable from batteries if this should be desired. A further object is the provision of an improved servo apparatus wherein the effects of component aging and changes in the response due to temperature variations are greatly minimized, thus enabling a substantial improvement in accuracy to be realized over long periods of time and under adverse environmental conditions.

The above objects are accomplished by the provision of a novel and improved control apparatus comprising an electrically energized light-emitting means, a control photosensitive device having an expansive sensing surface for receiving a portion of the light beam from said emitting means, a movable light-control member disposed in the path of said light to controllably intercept portions thereof and thus produce defined shadowed and illuminated areas on the sensing surface, and a novel and unique compensating circuit for maintaining constant the output response of the control photosensitive device for various given fixed positions of the movable light-control member. The compensating circuit comprises a second or compensating photosensitive device receiving light from the light-emitting means and amplifying means having its input connected with the compensating photosensitive device and its output connected with the light-emitting means, the amplifying means thus constituting a control of the intensity of the latter.

By the present invention the control apparatus is employed in a servo-indicator comprising a galvanometer movement directly carrying the movable light-control member, an amplifier having its output connected to the galvanometer to drive the latter, and a balanced impedance network or bridge comprising a plurality of legs one of which comprises the control photosensitive device and another of which comprises a condition-responsive transducer. The amplifier input is connected with the balanced network to thereby monitor changes in the condition thereof. The amplifier is so arranged as to increase the energy to the galvanometer when an unbalance of the impedance network occurs in response to a change in the state of the condition-responsive transducer. Movement of the galvanometer causes a shift in the position of the light-control member and gives rise to a corresponding change in the relative size of the illuminated and shadowed areas on the channel photosensitive device sensing surface, so as to re-establish the balance of the impedance network. The new, deflected position of the galvanometer thus indicates the new condition affecting the transducer, whereby the galvanometer positions are a function of the conditions sensed by the transducer and programmed by the light-beam control. The galvanometer movable element constitutes the single moving part of the device, and all components can be small, compact and lightweight with little power needed.

Still other features and advantages will hereinafter appear.

In the accompanying drawings showing a number of different embodiments of the invention:

FIG. 9 is a schematic circuit diagram of the novel control apparatus employed in the servo device as provided by the present invention.

Figure 1:
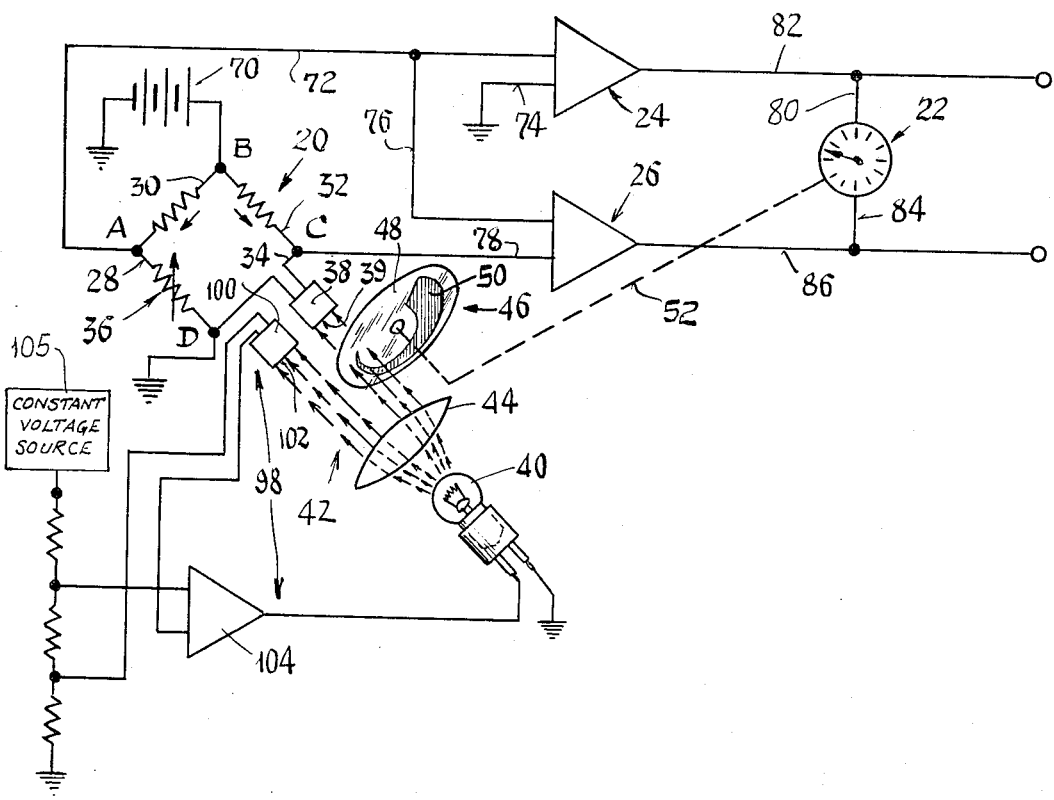
FIG. 1 is a part diagrammatic part block diagram representation of the novel control apparatus and servo device of the present invention, this figure illustrating one embodiment thereof.

Considering first FIG. 1, there is illustrated a servo indicator device comprising a balanced impedance network 20 which can take the form of a Wheatstone bridge, and amplifiers 24 and 26 having input circuitry connected with the bridge and output circuitry connected with the galvanometer 22 to drive the latter. The bridge 20 comprises a plurality of legs 28, 30, 32 and 34 and has terminals A, B, C and D constituting output means connected with the brdige legs. In one bridge leg 28 there is interposed a condition-responsive transducer 36 which can, for example, be a resistance thermometer bulb, and in another symmetrically disposed bridge leg 34 there is connected what I term a "control" photosensitive device 38 which has an expansive sensing surface 39. If has an output response characterized by a measurable electrical output parameter such as conductance (resistance), voltage or current. There is further provided a small incandescent electric lamp 40 constituting electrically energized light-emitting means providing a source of light to strike the sensing surface 39 of the control photosensitive device 38. A condensing lens 44 constituting light-concentrating means receiving light from the light-emitting means collects the light into a beam 42.

Figure 5:
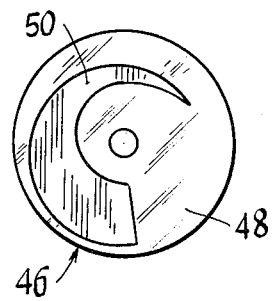
FIG. 5 is an elevational view of the light-control member of FIG. 4, illustrating a uniformly-tapered opaque portion thereof.

Referring again to FIG. 1, there is further illustrated movable means interposed in the path of a portion of the beam 42 for controllably intercepting certain portions of the latter to thereby produce defined shadowed and illuminated areas on the sensing surface 39 of the control photosensitive device 38, the means comprising a movable light-control member 46 particularly illustrated in FIG. 5. The member 46 is adapted to progressively vary the amount of light which passes from the light-emitting means 40 to the control photosensitive device 38 in response to rotation of the member. The member has the form of a substantially flat sheet with a transparent portion 48 through which light can pass and an elongate opaque portion 50 having a wedge-like configuration and being located within the transparent portion 48.

Figure 4:
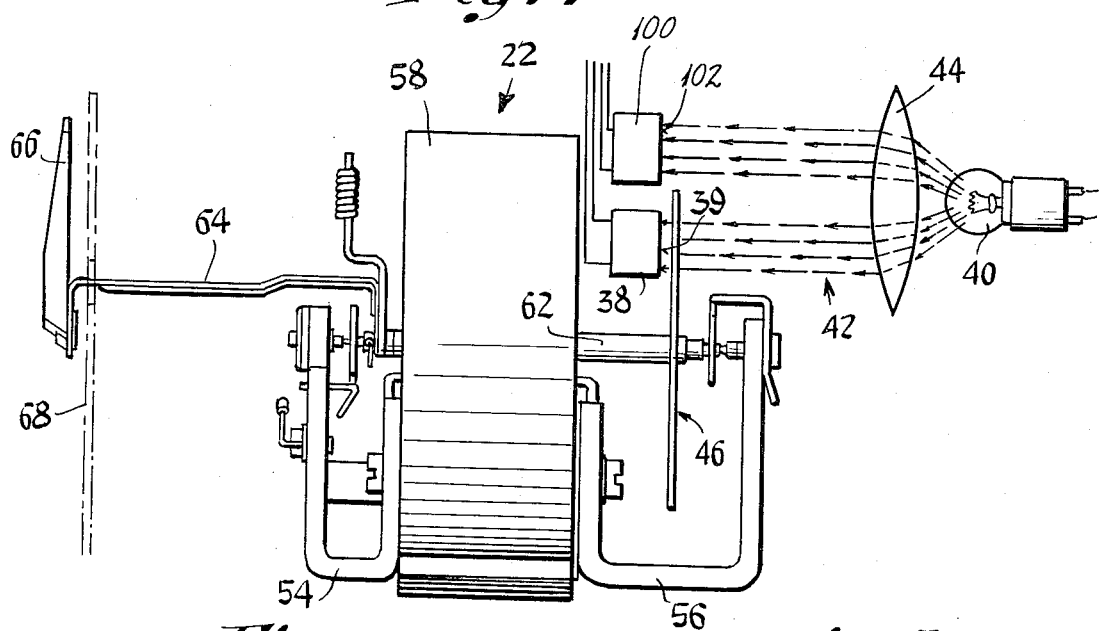
FIG. 4 is a side elevational view of the instrument movement of FIG. 2, showing in addition to other details the light-control member associated therewith.
Figure 3:
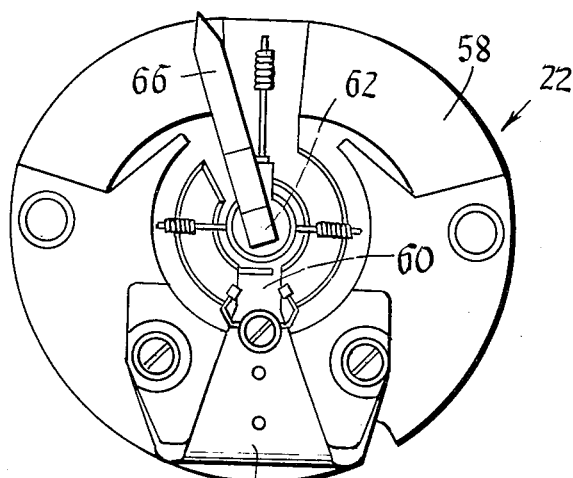
FIG. 3 is a front elevational view of an instrument movement of the D'Arsonval or galvanometer type as used with the servo system of the invention.

FIG. 1 shows a dotted line 52 joining the movable member 46 and the galvanometer 22, indicating a mechanical connection between the movement 22 and member 46. The member 46 is preferably provided with a mounting hole at its center to enable it to be mounted directly on the galvanometer spindle. Such a galvanometer movement can in large part be of conventional construction, having front and rear bearing or pivot support members 54, 56 respectively, a permanent magnet field structure 58, a moving coil 60 carried by the spindle 62, and a pointer assemblage 64 including a pointer 66. Associated with the pointer 66 is a dial 68. The arrangement is such that deflection of the movable coil system of the galvanometer 22 results in deflecting movement of the light-control member 46 about the axis of the instrument movement. FIG. 4 illustrates the arrangement wherein the light-control member 46 is carried directly on the galvanometer spindle 62. The lamp 40 and lens 44 are shown disposed to the rear of the instrument movement 22, with the opaque portion 50 of the member 46 intercepting part of the light beam 42 which would normally strike the central portion of the sensing surface 39 of the control photosensitive device 38.

Considering again FIG. 1, one set of opposite corners B, D of the bridge 20 is energized from a battery 70 having one terminal grounded. A corner terminal A of the bridge 20 is connected by a line 72 to what I term a "positioning amplifier," constituting the amplifier 24 whose other input lead 74 is grounded. Thus, the positioning amplifier 24 will be responsive to the potential across the leg 28 of the bridge 20, and it will be seen that the condition-responsive tranducer 36 comprises the said leg whereby voltage variations across the transducer will also be present at the input of the positioning amplifier 24. The amplifier 26 which I term herein a "null" amplifier has one input lead 76 connected to the input lead 72 of the amplifier 24 and has its other input lead 78 connected to the brdige corner C which is opposite the corner A. Thus, the input to the null amplifier 26 will be taken from the opposite bridge corners A, C, and will be subjected to voltage differences between the said bridge corners.

The positioning amplifier 24 is so arranged as to drive the galvanometer 22. In effecting this, the galvanometer has a lead 80 connected to an output line 82 of the positioning amplifier 24 and has a second lead 84 connected to an output line 86 of the null amplifier 26.

The null amplifier 26 provides an output which is opposite in polarity to that of the positioning amplifier and therefore drives the meter of galvanometer 22 even more rapidly in a given direction when a unblanced condition of the bridge 20 exists. For a balanced condition of the bridge 20, the null amplifier 26 has zero output, and the galvanometer 22 indicates the difference beween the amplifier outputs.

The operation of the servo device can now be understood. Referring to FIG. 1, assuming a balanced condition of the bridge, the output of the amplifier 26 would be zero, and the galvanometer 22 will have a predetermined position by which a certain amount of light from the lamp 40 is allowed to strike the sensing surface 39 of the control photosensitive device 38 so as to balance out the transducer 36 which is subjected to a condition such as heat, pressure, strain, etc. Since the galvanometer 22 is at rest, the pointer 66 thereof will have a definite indicating position, and the dial 68 can be graduated to various units depending on the use to which the servo system is put. The indication of the pointer 66 on the dial 68 accordingly can be an indication of the condition to which the transducer 36 responds. For example, the dial 62 can be calibrated in degrees temperature or various other units, as is well understood. Upon a change in the condition influencing the transducer 36, the latter will change its electrical characteristic and effect an unblance of the bridge 20. This will result in the amplifiers 24, 26 driving the galvanometer either upscale or downscale, depending on the direction of change of the condition.

Deflection of the galvanometer will result in the light beam 42 being modified by the light-control member 46 so as to allow either more or less light to strike the sensing surface 39 of the control photosensitive device 38. The change in light and the response of the device 38 is such as to re-establish the balance of the bridge; the galvanometer will deflect the required extent to supply the necessary amount of light to the device 38 for effecting such balance. Upon the bridge again becoming balanced, the galvanometer needle 66 will now have a new position, indicating a new value on the dial 68 which corresponds to the new value of the condition which influences the transducer 36.

Accordingly, the response of the galvanometer 22 is seen to be a function of the changes in the condition which influences the transducer. The galvanometer thus can function as a position transducer for angular or even for linear values, since conversion from angular to straight line motion can be readily effected either optionally or by other suitable means. The present servo-system can also operate as a basic function generator, giving an electrical as well as a mechanical output. Instead of the cell being of the conductive type, it can be of the generative type, whereby a voltage is generated as a result of light striking the cell. Alternately, the device can be of the current generator type such as a light-sensitive diode.

The amplifiers 24, 26 can be of the solid state variety, both incorporated in a single chip of miniature size. Likewise, the bridge 20 requires little space and the same is true of the lamp 40 and optical system involving the lens 44, light-control member 46 and control photosensitive device 38. Also, instrument movement of the D'Arsonval type are currently manufactured so as to require relatively little space, whereby the entire servo unit can be especially small and compact, and of light weight. Further, the electrical energization needed can be supplied from small batteries whereby the entire unit is readily portable. Servicing is kept to a minimum inasmuch as but a single movable part is involved, that comprising the movable system of the galvanometer which carries the light beam control member. A high degree of accuracy and reliability is had in the servo system, and the fabrication cost can be relatively low.

Figure 6:
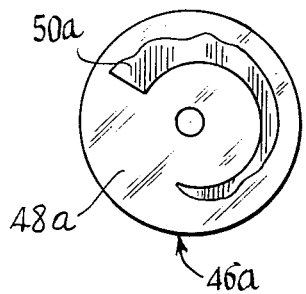
FIG. 6 is an elevational view of a light-control member similar to that of FIG. 5 but having a tapered opaque portion of irregular configuration.
Figure 7:
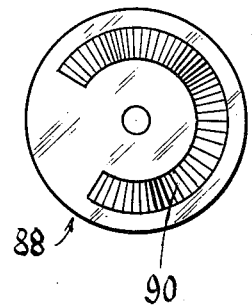
FIG. 7 is an elevational view of a light-control member similar to that of FIGS. 5 and 6 but having a semitransparent portion of variable opacity which varies according to a predetermined pattern.

It will be readily understood that the particular configuration of the light-control member 46 illustrated in FIGS. 1 and 5 can be modified to alter the amount of light striking the sensing surface 39 according to a predetermined pattern in response to movement of the member 46. Two such modifications are illustrated in FIGS. 6 and 7, respectively. FIG. 6 shows a control member 46a in the form of a flat sheet, having a transparent portion 48a and an elongate opaque portion 50a. By "tailoring" the shape of the opaque portion of the member, a wide variety of response characteristics (of the galvanometer indicator or of the electrical output of amplifiers 24 and 26) can be obtained, including expanded scales, logarithmic responses, exponential responses, and the like. In FIG. 7, a light-control member 88 is illustrated, having an arcuate aperture which is spanned by a translucent film 90 of graduated opacity, with some intermediate portions made purposely less translucent to provide a desired, non-uniform characteristic. As in the case of FIG. 6, by properly laying out the translucency of the film, one can obtain many varied response characteristics. The member 88 could be used in place of the member 46a shown in FIG. 6, as can be understood.

FIG. 9 provides more details of the circuitry of the servo indicator involving the bridge 20 and positioning and null amplifiers 24, 26. Nine volt potentials of opposite polarities are applied to terminals H and J respectively, to power the amplifiers 24, 26. The potential applied to the bridge 20 is seen to be 5 volts (fed to terminal I). Terminal G is at ground potential. Terminals E and F are adapted to be connected to a condition responsive transducer such as a resistance-thermometer bulb, strain gauge, or the like. The galvanometer 22 can be a sensitivity which provides full scale deflection for from zero to 2 milliamperes or other sensitivities as desired. The various values of resistors, and capacitors assocaited with the amplifiers, bridge and galvanometer are indicated on the circuit, together with the connections of the various components. One skilled in solid state circuitry will be above to readily produce the system illustrated in FIG. 9 from the information given. The amplifiers 24, 26, both on a single chip, are commercially available products, identified by the number MC1437L. The pin members corresponding to the MC1437L are shown only in the interest of making a complete disclosure. However, in place of the exact amplifier chip designated, equivalent amplifier chips can be utilized, either with or without alteration of the circuitry depending on the various requirements. Calibration of the system is possible to obtain an initial galvanometer reading corresponding to the particular brilliance of the lamp 40 at any time. This can be effected by the variable resistor 92 shown in FIG. 9. Variable resistors 94 and 96 associated respectively with the amplifiers 24, 26 enable adjustment of the respective gains thereof to be effected.

Figure 2:
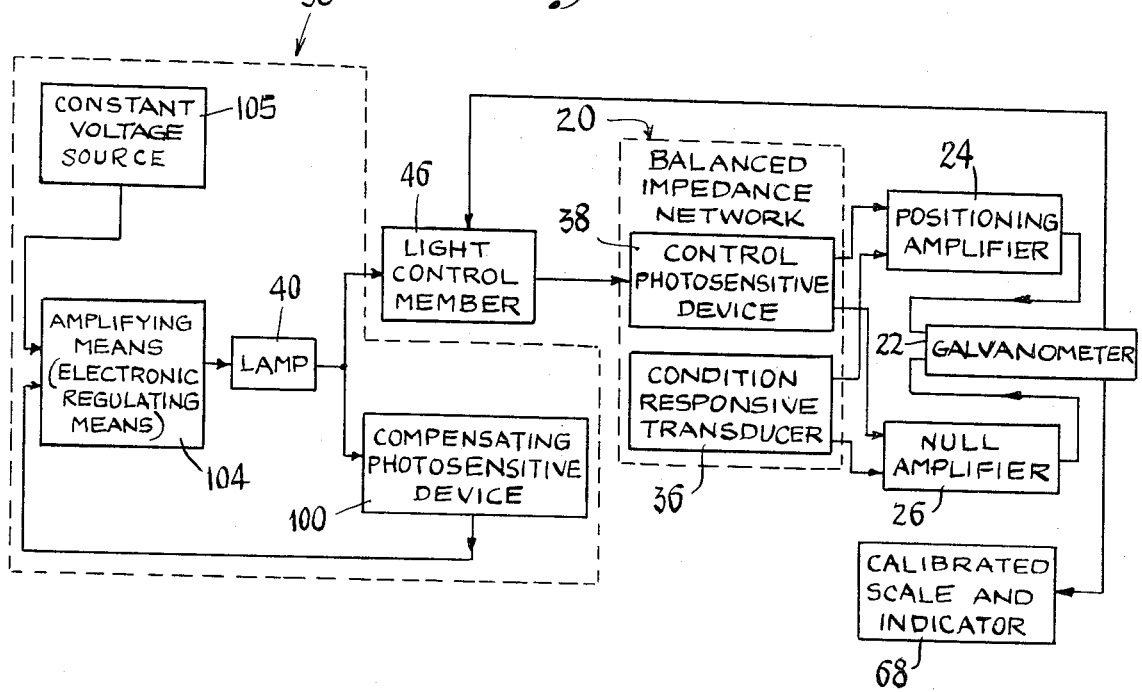
FIG. 2 is a block diagram of the servo-indicator device of the present invention particularly illustrating the control apparatus associated therewith.

Referring now to FIGS. 1 and 2, in accordance with the present invention there is illustrated a novel control apparatus for use in a servo, such apparatus being generally designated by the numeral 98. FIG. 2 is a block diagram of the control apparatus as employed in the servo-indicator device described hereinabove. The control apparatus comprises a novel and unique compensating circuit including a second or compensating photosensitive device 100 having a sensing surface 102 positioned to receive continuous and non-intercepted portions of the light beam 42 produced by the light-emitting means 40. The compensating circuit further includes amplifying means 104, constituting electronic means for regulating the intensity of the light produced by the light-emitting means 40. The amplifying means 104 has an input circuit connected with the compensating photosensitive device 100, and an output circuit connected with the lamp 40 whereby the lamp intensity is determined by the amplitude of the output of the amplifying means. A constant voltage source 105 supplies a fixed reference voltage to the input circuit of the amplifying means in order to establish an operating point therefor. The amplifying means operates to maintain constant the output response of the compensating photosensitive device 100 (which will also have the desired effect of maintaining constant the output response of the control photosensitive device 38 for given fixed positions of the light-control member 46). Thus, any changes which do occur in the output response of the control photosensitive device 38 are confined only to variations in the relative size of the illuminated and shadowed areas on the sensing surface 39, such changes arising solely from movement of the light-control member 46.

The control photosensitive device 38 and the compensating photosensitive device 100 have output responses which are determined by conversion characteristics which respectively relate changes in the measurable electrical output parameter of each to changes in the light striking the sensing surfaces of each. This output parameter may be voltage, current or conductivity. In accordance with the present invention, the control photosensitive device 38 and the compensating photosensitive device 100 are preferably of the same type and are selected from the same "batch" in order that any changes in the conversion characteristic of one due to temperature variations and due to aging are closely matched by a corresponding change in both magnitude and direction in the conversion characteristic of the other. By this arrangement, changes in the conversion characteristic of the control photosensitive device 38 due to temperature variations and aging also occur in a similar fashion in the conversion characteristic of the compensating photosensitive device 100, which indicates such changes to the electronic regulating means. The regulating means in turn adjusts the intensity of the lamp 40 so as to oppose the original change in the conversion characteristics of both devices 38 and 100.

Preferably the sensing surfaces 39 and 102 respectively of the control and compensating photosensitive devices 38 and 100 are closely juxtaposed to one another and face the light-emitting means 40 as illustrated in FIGS. 1 and 4, such that substantially all of the light striking the sensing surfaces passes through the lens 44. By this arrangement any minute reduction in the intensity of the light striking the sensing surface 39 of the control photosensitive device 38 due to lens clouding, fogging, or coating with debris will be accompanied by a corresponding minute reduction in the intensity of light striking the sensing surface 102 of the compensating photosensitive device 100, which in turn will signal the electronic regulating means to increase the light output from the lamp 40 and thus maintain constant for all practical purposes the out response of the control photosensitive device 38 (for given fixed positions of the light-control member 46). In a similar manner, a minute change in the intensity of light from the lamp 40 due to aging is sensed by the compensating photosensitive device, which signals such a change to the regulating means 104. The regulating means in turn varies the light intensity so as to oppose the original change. It should be noted that, as best illustrated in FIGS. 1 and 4, the movable member 46 is so positioned as to enable its interception of a portion of the light which would normally fall on the sensing surface 39 of control photosensitive device 38. However, the compensating photosensitive device sensing surface 102 is always out of the path of light intercepted by the movable light-control member 46, and thus is unaffected by changes on the position thereof.

By the above arrangement of the control apparatus 98 comprising the compensating circuit, serious errors in the servo indicator device which would normally adversely affect its performance are greatly minimized. By the provision of the novel compensating circuit of this invention, the changes which occur in the conversion characteristic of the control photosensitive device 38 due to temperature variations and aging of the device, as well as changes in the intensity of the lamp 40, and variations in the light transmission medium (fogging of the lens, etc.) are compensated for by automatically regulating the output intensity of the lamp 40. As a result, the occurrence of such variations does not introduce any substantial error into the servo-indicator device.

FIG. 9 illustrates the schematic circuit diagram of a typical compensating circuit, comprising an integrated circuit amplifier 106 and transistor amplifier stage 108, driving the lamp 40. Twelve volt potentials of opposite polarity are supplied to the amplifier 106 through terminals K and M. Terminal L is energized with a constant voltage (+7 volts) from the voltage source 105 (FIG. 2). Resistor 110 is selected to determine the initial brilliance of the lamp 40.

Figure 8:
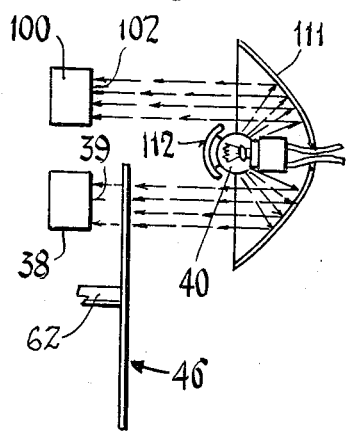
FIG. 8 is a side elevational view of a control apparatus constituting another embodiment of the invention and particularly illustrating a reflecting mirror of generally concave configuration.

Another embodiment of the invention is illustrated in FIG. 8, wherein the light-concentrating means comprises a reflecting mirror 111 of generally concave configuration. The lamp 40 is preferably as small as possible and located at the focal point of the mirror. An opaque light shield 112 prevents stray emission from the bulb to the photosensitive devices 38 and 100. It will be understood that the arrangement depicted in FIG. 8 can be directly substituted for the light 40 and lens 44 arrangement of FIG. 4. In FIG. 8 it is noted that the compensating photosensitive device 100 is completely out of the path of light intercepted by the light-control member 46, and thus receives continuous light or excitation from the lamp 40.

The present servo indicator device illustrated in FIG. 1 can also be readily adapted for use as a function generator, simply by removing the resistors between terminals A and B, and A and D respectively. When this is done, a variable voltage fed into terminal A, such as a sawtooth, triangular wave or slowly varying d.c. signal can be used to generate a large number of functional responses at the output terminals 82 and 86 of the amplifiers 24 and 26 respectively, with the functional relationship between the input and output voltages being determined by the particular configuration of the opaque portion of the light-control member 46, as can be readily understood. Thus, in addition to operating as an indicator device, the circuit of FIG. 1 have valuable applications as a function generator.

It will now be seen from the foregoing that I have provided a novel and improved control apparatus for use in a servo-indicator device, which is simple in construction, utilizes components readily available in the electronic market, and effectively reduces to an absolute minimum the errors due to component variation in the servo-indicator device. The unit is reliable in operation and physically small in size, and thus represents a distinct advance and improvement in the field of servo technology.

Variations and modifications are possible without departing from the spirit of the invention.

I claim:

1. A control apparatus for use in a servo, comprising in combination:
   a. a control photosensitive device having an expansive sensing surface and having a response characterized by a measurable electrical output parameter.
   b. electrically-energized, light-emitting means providing a source of light to strike said sensing surface,
   c. movable means interposed in the path of said light, for controllably intercepting certain portions of the latter to produce defined shadowed and illuminated areas on said sensing surface,
   d. a compensating photosensitive device having a sensing surface positioned to receive other continuous portions of the light produced by said light-emitting means, said compensating device sensing surface being entirely out of the path of light intercepted by the movable means, e. light-concentrating means receiving light from said light-emitting means, for collecting said light into a beam of substantially parallel rays to strike the sensing surfaces of said control photosensitive device, and of said compensating photosensitive device, f. said light-concentrating means comprising a lens interposed between said light-emitting means and the sensing surfaces of said photosensitive devices, and g. electronic means connected with said compensating photosensitive device and with said light-emitting means, for controlling the electrical energy supplied to the latter so as to regulate the intensity of the light produced thereby and thus maintain substantially constant the output response of said control photosensitive device for various given fixed positions of said movable means whereby changes in the response of the control photosensitive device are substantially confined only to variations in the relative size of the illuminated and shadowed areas on the sensing surface of said device, such as arise from changes in the position of said movable means, h. the sensing surfaces of said photosensitive devices being closely juxtaposed to one another and facing said lens, i. substantially all of the light striking said sensing surfaces passing through said lens whereby any reduction in the intensity of light striking the sensing surface of the control photosensitive device due to lens clouding and fogging will be accompanied by a corresponding reduction in the intensity of light striking the sensing surface of the compensating photosensitive device, thereby causing the electronic regulating means to increase the light output of said light-emitting means and thus maintain constant the output response of the control photosensitive device for various given positions of the movable member.

2. A control apparatus as in claim 1 wherein:
a. said light-emitting means comprises an incandescent lamp,
b. said electronic means comprising amplifying means having an input circuit connected with said compensating photosensitive device and an output circuit connected to said lamp whereby the lamp intensity is determined by the amplitude of the output of the amplifying means.

3. A control apparatus as in claim 1, wherein:
a. the responses of said photosensitive devices are determined by conversion characteristics which respectively relate changes in electrical output parameter to changes in the light input striking the sensing surfaces,
b. the changes in the conversion characteristic of each photosensitive device due to temperature variations and due to aging being substantially identical whereby changes in the conversion characteristic of the control photosensitive device due to temperature and aging are balanced out by similar and corresponding changes in the conversion characteristic of the compensating photosensitive device, thereby to maintain substantially constant the output response of the control photosensitive device with respect to time and with respect to variations in temperature for various given fixed positions of said movable means.

4. A control apparatus as in claim 3, wherein:
a. the measurable electrical output parameter comprises conductivity.

5. A control apparatus as in claim 1 and further including:
a. a galvanometer movement carrying said movable means, and
b. an amplifier having input circuitry connected with said control photosensitive device to monitor changes in the electrical output parameter thereof, and having output circuitry connected with said galvanometer to drive the latter.

6. A control apparatus as in claim 5 and further including:
a. a balanced impedance network comprising a plurality of legs and having terminals constituting output means connected to said legs,
b. one of said legs comprising said control photosensitive device, and
c. said amplifier input circuitry being connected to said output means to receive energy therefrom.

7. A control apparatus as in claim 6, wherein:
a. said balanced impedance network comprises a bridge circuit having four legs.

8. A control apparatus as in claim 6, wherein:
a. said movable means comprises a light-control member for progressively varying the amount of light which passes from the light-emitting means to the control photosensitive device in response to movement of the member whereby any upset in the balance of the impedance network results in a deflection of the galvanometer to alter the light striking the sensing surface of said control photosensitive device, thereby to effect a reestablishment of the balance of the network.

9. A control apparatus as in claim 8, wherein:
a. said light-control member comprises a substantially flat sheet having a transparent portion through which light can pass and having an elongate opaque portion located in said transparent portion, and
b. means mounting said member for rotation about an axis perpendicular to the plane of the sheet,
c. said opaque portion having a wedge-like configuration.

* * * * *